US007247676B2

(12) United States Patent
Morgan et al.

(10) Patent No.: US 7,247,676 B2
(45) Date of Patent: *Jul. 24, 2007

(54) FOR GOLF BALLS WITH NON-IONOMER CASING LAYER

(75) Inventors: William E. Morgan, Barrington, RI (US); Michael J. Sullivan, Barrington, RI (US); Derek A. Ladd, Acushnet, MA (US); Douglas E. Jones, Dartmouth, MA (US)

(73) Assignee: Acushnet Company, Fairhaven, MA (US)

( * ) Notice: Subject to any disclaimer, the term of this patent is extended or adjusted under 35 U.S.C. 154(b) by 213 days.

This patent is subject to a terminal disclaimer.

(21) Appl. No.: 10/958,000

(22) Filed: Oct. 4, 2004

(65) Prior Publication Data

US 2005/0085590 A1    Apr. 21, 2005

Related U.S. Application Data

(60) Continuation-in-part of application No. 10/402,592, filed on Mar. 28, 2003, now Pat. No. 7,005,479, which is a continuation-in-part of application No. 10/208,580, filed on Jul. 30, 2002, now Pat. No. 6,991,563, and a continuation-in-part of application No. 09/883,423, filed on Jun. 18, 2001, now Pat. No. 6,562,909, which is a continuation-in-part of application No. 09/775,793, filed on Feb. 5, 2001, now Pat. No. 6,812,317, which is a continuation-in-part of application No. 09/625,544, filed on Jul. 25, 2000, now Pat. No. 6,749,789, which is a continuation of application No. 09/207,690, filed on Dec. 9, 1998, now Pat. No. 6,132,324, which is a division of application No. 08/863,788, filed on May 27, 1997, now Pat. No. 5,885,172.

(51) Int. Cl.
*A63B 37/00* (2006.01)
*A63B 37/12* (2006.01)
*C08L 9/00* (2006.01)

(52) U.S. Cl. .................. 525/99; 473/373; 473/374
(58) Field of Classification Search .............. None
See application file for complete search history.

(56) References Cited

U.S. PATENT DOCUMENTS

| | | | |
|---|---|---|---|
| 4,123,061 A | 10/1978 | Dusbiber .................. 273/220 |
| 4,594,364 A | 6/1986 | Pawloski et al. ............ 521/85 |
| 4,708,908 A | 11/1987 | Tateoka et al. ......... 428/423.1 |
| 4,975,328 A | 12/1990 | Hirose et al. .............. 428/413 |
| 5,002,281 A | 3/1991 | Nakahara et al. ......... 273/220 |
| 5,006,297 A | 4/1991 | Brown et al. .............. 264/234 |
| 5,252,652 A | 10/1993 | Egashira et al. ........... 524/392 |
| 5,310,577 A | 5/1994 | Mase et al. ............ 427/412.1 |
| 5,334,673 A | 8/1994 | Wu .......................... 273/235 |
| 5,462,806 A | 10/1995 | Konishi et al. ............ 428/451 |
| 5,484,870 A | 1/1996 | Wu ............................. 528/28 |
| 5,496,641 A | 3/1996 | Mase et al. ............. 428/423.1 |
| 5,553,852 A | 9/1996 | Higuchi et al. ............ 473/373 |
| 5,697,856 A | 12/1997 | Moriyama et al. ......... 473/374 |
| 5,733,428 A | 3/1998 | Calabria et al. ........... 264/134 |
| 5,753,730 A | 5/1998 | Nagata et al. ............. 524/136 |
| 5,757,464 A | 5/1998 | Volk .......................... 351/219 |
| 5,790,232 A | 8/1998 | Hagiwara et al. .......... 351/177 |
| 5,803,834 A | 9/1998 | Yamagishi et al. ........ 473/377 |
| 5,811,506 A | 9/1998 | Slagel ......................... 528/64 |
| 5,816,944 A | 10/1998 | Asakura et al. ............ 473/372 |
| 5,830,578 A | 11/1998 | Ono et al. .................. 428/446 |
| 5,885,172 A | 3/1999 | Hebert et al. .............. 473/354 |
| 5,962,617 A | 10/1999 | Slagel ......................... 528/61 |
| 5,967,908 A | 10/1999 | Yamagishi et al. ........ 473/373 |
| 6,018,003 A | 1/2000 | Sullivan et al. ......... 525/333.8 |
| 6,027,816 A | 2/2000 | Ono et al. .................. 428/447 |
| 6,056,842 A | 5/2000 | Dalton et al. .............. 156/243 |
| 6,070,979 A | 6/2000 | Kagei et al. ............... 351/159 |
| 6,083,119 A | 7/2000 | Sullivan et al. ............ 473/354 |
| 6,126,558 A | 10/2000 | Higuchi et al. ............ 473/374 |
| 6,127,505 A | 10/2000 | Slagel ......................... 528/61 |
| 6,129,640 A | 10/2000 | Higuchi et al. ............ 473/374 |
| 6,132,324 A | 10/2000 | Hebert et al. .............. 473/378 |
| 6,139,447 A | 10/2000 | Ohama ...................... 473/378 |
| 6,180,722 B1 | 1/2001 | Dalton et al. .............. 525/193 |
| 6,184,301 B1 | 2/2001 | Shindo et al. .............. 525/261 |
| 6,213,892 B1 | 4/2001 | Felker et al. ............... 473/370 |
| 6,246,809 B1 | 6/2001 | Jouanno et al. .............. 385/22 |
| 6,258,917 B1 | 7/2001 | Slagel ......................... 528/64 |
| 6,276,994 B1 | 8/2001 | Yoshida et al. .............. 451/41 |
| 6,287,217 B1 | 9/2001 | Sullivan et al. ............ 473/374 |
| 6,290,614 B1 | 9/2001 | Kennedy, III et al. ...... 473/378 |
| 6,302,808 B1 | 10/2001 | Dalton et al. .............. 473/371 |
| 6,316,915 B1 | 11/2001 | Fujiwara et al. ........... 320/134 |
| 6,465,578 B1 | 10/2002 | Bissonnette et al. ........ 525/261 |
| 6,506,851 B2 | 1/2003 | Wu ............................ 525/415 |
| 6,525,141 B2 | 2/2003 | Kataoka ..................... 525/261 |
| 6,562,909 B2 * | 5/2003 | Morgan ...................... 525/237 |

(Continued)

FOREIGN PATENT DOCUMENTS

JP         60208379        * 10/1985

*Primary Examiner*—David J. Buttner
(74) *Attorney, Agent, or Firm*—Mandi B. Milbank

(57) ABSTRACT

This invention is related to multi-layer golf balls having an inner cover layer comprising a blend of styrene-block copolymer and trans-polyisoprene, an outer cover layer comprising a polyurethane, a polyurea or a mixture thereof, and a core comprising of thermosetting or thermoplastic materials.

28 Claims, 1 Drawing Sheet

U.S. PATENT DOCUMENTS

| | | |
|---|---|---|
| 6,632,147 B2 | 10/2003 | Cavallaro et al. ........... 473/374 |
| 6,749,789 B1 | 6/2004 | Hebert et al. ............... 264/250 |
| 7,005,479 B2 * | 2/2006 | Morgan et al. ............. 525/274 |
| 2002/0010037 A1 | 1/2002 | Nesbitt ....................... 473/371 |
| 2002/0039936 A1 | 4/2002 | Binette et al. .............. 473/374 |
| 2002/0147057 A1 | 10/2002 | Binette et al. .............. 473/378 |

* cited by examiner

FOR GOLF BALLS WITH NON-IONOMER CASING LAYER

CROSS REFERENCE TO RELATED APPLICATIONS

This application is a continuation-in-part of U.S. patent application Ser. No. 10/402,592, filed Mar. 28, 2003, now U.S. Pat. No. 7,005,479, which is a continuation-in-pan of U.S. patent application Ser. No. 10/208,580, filed Jul. 30, 2002, now U.S. Pat. No. 6,991,563, and also a continuation-in-part of U.S. patent application Ser. No. 09/883,423, filed on Jun. 18, 2001, now U.S. Pat. No. 6,562,909, which is a continuation-in-part of U.S. patent application Ser. No. 09/775,793, filed Feb. 5, 2001, now U.S. Pat. No. 6.812,317, which is a continuation-in-part of U.S. patent application Ser. No. 09/625,544, filed Jul. 25, 2000, now U.S. Pat. No. 6,749,789, which is a continuation of U.S. patent application Ser. No. 09/207,690, filed Dec. 9, 1998, now U.S. Pat. No. 6,132,324, which is a divisional of U.S. patent application Ser. No. 08/863,788, filed May 27, 1997, now U.S. Pat. No. 5,885,172, the disclosures of which are all hereby incorporated by reference.

FIELD OF THE INVENTION

This invention relates to a multi-layer golf ball, comprising at least an inner cover layer, an outer layer and a core, wherein the inner cover layer comprises a blend of styrene-block copolymer and trans-polyisoprene.

BACKGROUND OF THE INVENTION

Conventional golf balls can be divided into two general groups: solid balls or wound balls. The difference in playing characteristics resulting from these different types of construction can be significant. Balls having a solid construction are popular with golfers because they provide durability and maximum distance. Solid balls are generally made with a solid core, usually made of a cross linked rubber, enclosed by a cover material. Typically, the solid core is made of polybutadiene crosslinked with zinc diacrylate and/or similar crosslinking agents. Solid cores may also contain a number of layers. The cover is generally an ionomeric material, such as SURLYN®, which is a tradename for a family of ionomer resins produced by E. I. DuPont de Nemours & Co. of Wilmington, Del. Covers may include one or more layers.

The combination of the solid core and ionomeric cover materials provide a ball that is durable and abrasion resistant. However, because these materials are rigid, solid balls can have a hard "feel" when struck with a club. Also, due to their construction, these balls tend to have a relatively lower spin rate and higher initial velocity, which can provide greater distance and increased accuracy off the tee but less control for greenside play.

Recently, manufacturers have investigated the use of alternative polymers, such as polyurethane, for use as golf ball covers. For example, U.S. Pat. No. 6,132,324, incorporated herein by reference, discloses a method of making a golf ball having a polyurethane cover. Polyurethanes have been recognized as useful materials for golf balls since about 1960. Polyurethane compositions are the product of a reaction between a curing agent and a polyurethane prepolymer, which is itself a product formed by a reaction between a polyahl and an isocyanate. As disclosed in U.S. Pat. No. 4,594,364 to Pawloski, et al., "polyahl" includes any organic compound having at least two active hydrogen moieties and an average molecular weight of at least 62. Illustrative of such active hydrogen moieties are —COOH, —OH, $NH_2$, =NH, $—CONH_2$, —SH and —CONH—. Typical polyahls include polyols, polyamines, polyamides, polymercaptans, polyacids, and the like. The curing agents used previously are typically diamines or polyols. A catalyst is often employed to promote the reaction between the curing agent and the polyurethane prepolymer.

U.S. Pat. No. 4,123,061 discloses a trifunctional polyol, a tetrafunctional polyol, and a diamine curing agents. U.S. Pat. No. 5,334,673 discloses the use of thermosetting and thermoplastic polyurethanes for forming golf ball covers and, in particular, thermosetting polyurethane made from a composition of polyurethane prepolymer and a slow-reacting amine curing agent, and/or a difunctional glycol.

The first commercially successful polyurethane covered golf ball was the Titleist Professional ball, first released in 1993. Subsequently, the Titleist Pro-V1 ball was introduced successfully in 2000 with a solid resilient polybutadiene core, a hard ionomer casing and a polyurethane cover. The Pro-V1 ball provided both professional and amateur players with long distance off of drivers and control for greenside play.

There remains a need to incorporate a nonionomeric casing layer into a multilayer golf ball so that it will perform as well as a golf ball having an ionomer casing.

SUMMARY OF THE INVENTION

The present invention is directed to a multi-layer golf ball comprising at least an inner cover layer, an outer cover layer and a core. The inner cover layer is a non-ionomeric material comprising a blend of a styrene-block copolymer, and a trans-polyisoprene. The golf ball preferably has a coefficient of restitution of at least about 0.805. The core preferably has a coefficient of restitution greater than that of the ball and is preferably at least about 0.815.

The blend in the inner cover layer ranges from a ratio of about 1 part of styrene-block copolymer to about 99 parts of trans-polyisoprene, to a ratio of about 50 parts of styrene-block copolymer to about 50 parts of trans-polyisoprene. Preferably, the blend in the inner cover layer is in a ratio of about 25 parts of styrene-block copolymer to about 75 parts of trans-polyisoprene.

The styrene-block copolymer is any one of styrene-butadiene-styrene, styrene-ethylene-butadiene-styrene, styrene-isobutylene-styrene, styrene-isoprene-styrene, styrene-methacrylate-butadiene, styrene-acrylonitrile, styrene-acrylonitrile-butadiene, styrene-ethylene-propylene-acrylonitrile, styrene-maleic anhydride, or blends thereof. The most preferred styrene-block copolymer is styrene-butadiene-styrene.

The inner cover layer has a specific gravity greater than about 1.0, preferably greater than about 3.0. The inner cover layer has a flexural modulus greater than about 50,000 psi, preferably greater than about 60,000 psi. The inner cover layer has a hardness greater than about Shore D 60.

The outer cover layer comprises a polyurethane, a polyurea, or a mixture thereof, and the outer cover layer has a hardness of Shore D 65 or less. The polyurethane and the polyurea are prepared from a suitable polyisocyanate. The polyurethane is prepared from a suitable polyol, and the polyurea is prepared from a suitable polyamine.

The core comprises thermosetting material, or thermoplastic material. The thermosetting material preferably comprises a polybutadiene, a cis-to-trans catalyst, a free radical source, a crosslinking agent, and a filler. The polybutadiene comprises cis-polybutadiene, trans-polybutadiene, vinyl-polybutadiene, or mixture thereof. The cis-to-trans catalyst comprises a organosulfur compound, a metal-containing organosulfur compound, a substituted aromatic organic compound that does not contain sulfur or metal, an unsubstituted aromatic organic compound that does not contain sulfur or metal, an inorganic sulfide compound, an aromatic organometallic compound, a Group VIA element, or mixtures thereof. The crosslinking agent is a member selected from the group consisting zinc acrylate, zinc diacrylate, zinc methacrylate, zinc dimethacrylate, and mixtures thereof.

The thermoplastic material of the core preferably comprises a highly neutralized ionomer formed from a reaction between an acid containing polymer, a suitable cation source, and a salt of an organic acid. The cation source is present in an amount sufficient to neutralize the acid by about 80% or greater, preferably by about 90% or greater, and most preferably by about 100%.

The HNP may further comprise partially neutralized (less than 80%) ionomeric copolymers, ionomeric terpolymers, ionomer precursors, thermoplastics, thermoplastic elastomers, grafted metallocene-catalyzed polymers, non-grafted metallocene-catalyzed polymers, single-site polymers, high-crystalline acid polymers and ionomers thereof. Suitable organic acids or salts thereof may comprises any one or more aliphatic, mono-, di-, or multifunctional, saturated or unsaturated organic acids having less than 36 carbon atoms such as stearic, oleic, behenic, erucic, linoleic, or dimerized derivatives, thereof.

BRIEF DESCRIPTION OF THE DRAWINGS

Further features and advantages of the invention can be ascertained from the following detailed description that is provided in connection with the drawing described below.

DEFINITIONS

Figure 1:
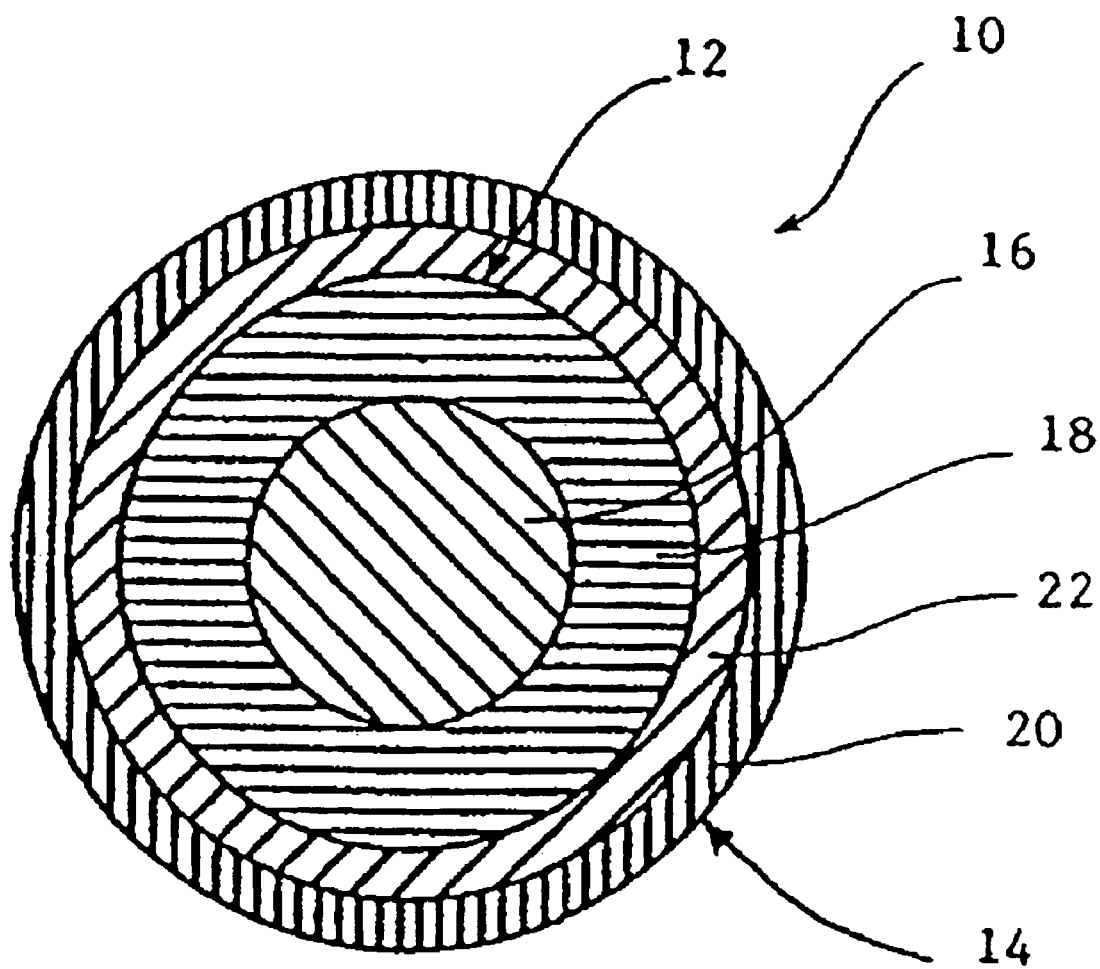
FIG. 1 is cross-sectional view of a first embodiment of a golf ball according to the present invention.

As used herein, substituted and unsubstituted "aryl" groups means a hydrocarbon ring bearing a system of conjugated double bonds, typically comprising 4n+2B ring electrons, where n is an integer. Examples of aryl groups include, but are not limited to phenyl, naphthyl, anisyl, tolyl, xylenyl and the like. According to the present invention, aryl also includes heteroaryl groups, e.g., pyrimidine or thiophene. These aryl groups may also be substituted with any number of a variety of functional groups. In addition to the functional groups described herein in connection with carbocyclic groups, functional groups on the aryl groups can include hydroxy and metal salts thereof; mercapto and metal salts thereof; halogen; amino, nitro, cyano, and amido; carboxyl including esters, acids, and metal salts thereof; silyl; acrylates and metal salts thereof; sulfonyl or sulfonamide; and phosphates and phosphites; and a combination thereof.

As used herein, the term "Atti compression" and "compression" are defined as the deflection of an object or material relative to the deflection of a calibrated spring, as measured with an Atti Compression Gauge, which is commercially available from Atti Engineering Corp. of Union City, N.J. Atti compression is typically used to measure the compression of a golf ball. Compression values are dependent on the diameter of the article being measured. When the Atti Gauge is used to measure cores having a diameter of less than 1.680 inches, it should be understood that a metallic or other suitable shim is used to make the measured object 1.680 inches in diameter.

As used herein, substituted and unsubstituted "carbocyclic" means cyclic carbon-containing compounds, including, but not limited to cyclopentyl, cyclohexyl, cycloheptyl, adamantyl, and the like. Such cyclic groups may also contain various substituents in which one or more hydrogen atoms have been replaced by a functional group. Such functional groups include those described above, and lower alkyl groups having from 1-28 carbon atoms. The cyclic groups of the invention may further comprise a heteroatom.

As used herein, "cis-to-trans catalyst" means any component or a combination thereof that will convert at least a portion of cis-polybutadiene isomer to trans-polybutadiene isomer at a given temperature. It should be understood that the combination of the cis-isomer, the trans-isomer, and any vinyl-isomer, measured at any given time, comprises 100 percent of the polybutadiene.

As used herein, the term "coefficient of restitution" ("COR") for golf balls is defined as the ratio of the rebound velocity to the inbound velocity when balls are fired into a rigid plate. The inbound velocity is understood to be 125 ft/s. The COR is a direct measure of the resilience of a golf ball at a particular inbound velocity. Since golf balls behave in a linear-viscoelastic fashion, inbound ball velocity is functionally equivalent to club swing speed. In one embodiment, the present invention seeks to maximize the COR for low swing speed players. These players swing the club at the ball with low swing speeds, and thus tend to obtain lower ball velocity after impact and less distance off the tee.

As used herein, the term "dynamic stiffness" is defined as load divided by the deflection for a 1.4-mm spherical radius penetration probe oscillating at 1 Hz with an amplitude of 100 microns. The probe dynamically penetrates the surface of a sample material. Material samples of spherical cores were prepared by sectioning out a 6-mm-thick layer along the equator of core to produce a disk 6 mm thick with one surface containing the geometric center of the core. By positioning the probe at any selected radial position on the disk, a dynamic stiffness measurement may be obtained. Accurate dynamic measurements may be made by keeping the material sample at a substantially uniform temperature. The dynamic stiffness was acquired using a Dynamic Mechanical Analyzer, Model DMA 2980 available from TA Instruments Corporation of New Castle, Del. The instrument setting for the DMA 2980 were 1-Hz frequency, 100-micron amplitude, 0.3-N static load, and auto strain of 105 percent. The 1.4-mm spherical radius probe is available from TA Instruments as a penetration kit accessory to the DMA 2980. The DMA 2980 is equipped with a temperature-controlled chamber that enables testing at a wide variety of ambient temperatures.

The method and instrument utilized for measuring "dynamic stiffness" may also be used to measure loss tangent. Loss tangent is the ratio of loss modulus to storage modulus. Loss modulus is the portion of modulus which is out of phase with displacement and storage modulus is the portion of modulus which is in phase with displacement. The DMA 2980 automatically calculates and reports loss tangent.

As used herein, the term "fluid" includes a liquid, a paste, a gel, a gas, or any combination thereof.

As used herein, the terms "Group VIA component" or "Group VIA element" mean a component that includes a sulfur component, a selenium component, or a tellurium component, or a combination thereof.

As used herein, the term "sulfur component" means a component that is elemental sulfur, polymeric sulfur, or a combination thereof. It should be further understood that "elemental sulfur" refers to the ring structure of $S_8$ and that "polymeric sulfur" is a structure including at least one additional sulfur relative to the elemental sulfur.

As used herein, the term "molecular weight" is defined as the absolute weight average molecular weight. The molecular weight is determined by the following method: approximately 20 mg of polymer is dissolved in 10 mL of tetrahydrofuran ("THF"), which may take a few days at room temperature depending on the polymer's molecular weight and distribution. One liter of THF is filtered and degassed before being placed in a high-performance liquid chromatography ("HPLC") reservoir. The flow rate of the HPLC is set to 1 mL/min through a Viscogel column. This non-shedding, mixed bed, column model $GMH_{HR}$-H, which has an ID of 7.8 mm and 300 mm long is available from Viscotek Corp. of Houston, Tex. The THF flow rate is set to 1 mL/min for at least one hour before sample analysis is begun or until stable detector baselines are achieved. During this purging of the column and detector, the internal temperature of the Viscotek TDA Model 300 triple detector should be set to 40° C. This detector is also available from Viscotek Corp. The three detectors (i.e., Refractive Index, Differential Pressure, and Light Scattering) and the column should be brought to thermal equilibrium, and the detectors should be purged and zeroed, to prepare the system for calibration according to the instructions provided with this equipment. A 100-μL aliquot of sample solution can then be injected into the equipment and the molecular weight of each sample can be calculated with the Viscotek's triple detector software. When the molecular weight of the polybutadiene material is measured, a dn/dc of 0.130 should always be used. It should be understood that this equipment and these methods provide the molecular weight numbers described and claimed herein, and that other equipment or methods will not necessarily provide equivalent values as used herein.

As used herein, the term "multilayer" means at least two layers and includes fluid or liquid center balls, wound balls, hollow-center balls, and balls with at least two intermediate layers and/or cover layers.

As used herein, the term "parts per hundred," also known as "phr," is defined as the number of parts by weight of a particular component present in a mixture, relative to 100 parts by weight of the total polymer component. Mathematically, this can be expressed as the weight of an ingredient divided by the total weight of the polymer, multiplied by a factor of 100.

As used herein the term "resilience index" is defined as the difference in loss tangent (tan δ) measured at 10 cpm and 1000 cpm divided by 990 (the frequency span) multiplied by 100,000 (for normalization and unit convenience). Loss tangent is obtained when measuring the dynamic stiffness of an object. Loss tangent and terminology relating to such dynamic properties is typically described according to ASTM D4092-90. The loss tangent is measured using an RPA 2000 manufactured by Alpha Technologies of Akron, Ohio. The RPA 2000 is set to sweep from 2.5 to 1000 cpm at a temperature of 100° C. using an arc of 0.5 degrees. An average of six loss tangent measurements were acquired at each frequency and the average is used in calculation of the resilience index. The computation of resilience index is as follows:

Resilience Index=100,000·[(loss tangent@10 cpm)−(loss tangent@1000 cpm)]/990

As used herein, the term "substantially free" means less than about 5 weight percent, preferably less than about 3 weight percent, more preferably less than about 1 weight percent, and most preferably less than about 0.01 weight percent.

As used herein, "flexural modulus" is measured by ASTM D6272-98, Procedure B. All flexural modulus results herein are as measured on test samples two weeks after molding. As used herein, the term "stiffness" refers to the flexural modulus.

As used herein, "hardness" refers to the hardness of the material forming the particular layer of the ball being discussed, as measured by ASTM D2240-00. Unless otherwise noted, hardness does not refer to the hardness of the golf ball.

DETAILED DESCRIPTION OF THE PREFERRED EMBODIMENTS

The present invention is directed to a multi-layer golf ball, comprising at least an inner cover layer, an outer layer and a core.

Referring to FIG. 1, the golf ball 10 of the present invention includes an outer cover layer 20 having an outer surface 14, an intermediate layer 22, and a core 12 that may contain one or more layers 16 and 18. Optionally, the outer core 18 is a wound layer. The intermediate layer 22 can be a mantle layer, another outer core layer, or an inner cover layer. As described herein, the intermediate layer 22 is an inner cover layer.

Inner cover layer 22 comprises a blend of styrene-block copolymer and trans-polyisoprene; outer cover layer 20 comprises a polyurethane, a polyurea, or mixture thereof; and core 16 can be either a thermosetting material or a thermoplastic material. Preferably the COR of core 16 is higher than the COR of ball 10. The golf ball according to the present invention exhibits high resilience in order to provide greater distance off the tee while conforming to the USGA golf rules.

In one embodiment, golf ball 10 of the present invention is a multi-layer golf ball comprising:

(a) an inner cover layer made from a blend of styrene-block copolymer, trans-polyisoprene and a filler so that the flexural modulus of the blend is greater than about 50,000 psi, and the specific gravity of the blend is greater than about 1.0, preferably greater than about 3.0, (b) an outer cover made from a polyurethane, a polyurea, or a mixture thereof having a hardness of less than Shore D 65, and (c) a core comprising either thermosetting material such as polybutadiene, crosslinked with ZDA, peroxide and a cis-to-trans catalyst, or thermoplastic material such as highly or fully neutralized polymer, whereby the core has a diameter at least 1.55 inches, a compression of less than about 85, and a COR greater than about 0.815, and whereby the golf ball has a coefficient of restitution of at least 0.805.

Depending on the desired properties, balls prepared according to the invention can exhibit substantially the same or higher resilience, or COR, with a decrease in compression or flexural modulus, compared to balls of conventional construction. Additionally, balls prepared according to the invention can also exhibit substantially higher COR, without an increase in compression, compared to balls of conventional construction. Also, a lower loss tangent indicates a higher resiliency, thereby indicating a higher rebound capacity. Low loss tangent indicates that most of the energy imparted to a golf ball from the club is converted to dynamic energy, i.e., launch velocity and resulting longer distance. The rigidity or compressive stiffness of a golf ball may be measured, for example, by the dynamic stiffness. A higher dynamic stiffness indicates a higher compressive stiffness. To produce golf balls having a desirable compressive stiffness, the dynamic stiffness of the crosslinked polybutadiene reaction product should be less than about 50,000 N/m at −50° C. Preferably, the dynamic stiffness should be from about 10,000 to about 40,000 N/m at −50° C., more preferably, the dynamic stiffness should be from about 20,000 to about 30,000 N/m at −50° C.

The dynamic stiffness is similar in some ways to dynamic modulus. Dynamic stiffness is dependent on probe geometry as described herein, whereas dynamic modulus is a unique material property, independent of geometry. The dynamic stiffness measurement has the unique attribute of enabling quantitative measurement of dynamic modulus and exact measurement of loss tangent at discrete points within a sample article. In the case of this invention, the article is at least a portion of a golf ball core. The polybutadiene core preferably has a loss tangent below about 0.1 at −50° C., and more preferably below about 0.07 at −50° C.

Inner cover layer 22 of the present invention preferably comprises a blend of styrene-block copolymer, trans-isoprene and a filler. Examples of styrene-block copolymer include, but not limited to, styrene-styrene-butadiene-styrene, styrene-ethylene-butadiene-styrene, styrene-isobutylene-styrene, styrene-isoprene-styrene, styrene-methacrylate-butadiene, styrene-acrylonitrile, styrene-acrylonitrile-butadiene, styrene-ethylene-propylene-acrylonitrile, styrene-maleic anhydride, and blends thereof. The most preferred styrene-block copolymer is styrene-butadiene-styrene ("SBS"), also commonly known as "SBS block copolymer."

As discussed in U.S. Pat. App. Publication 2003/0064828 of Kato, other examples of styrene-based thermoplastic elastomers include, but are not limited to, styrene-isoprene-butadiene-styrene (SIBS) block copolymer, or hydrogenation product thereof, styrene-ethylene-butylene-styrene (SEBS) block copolymer, styrene-ethylene-propylene-styrene (SEPS) block copolymer, and styrene-ethylene-ethylene-propylene-styrene (SEEPS) block copolymers.

SBS is a hard rubber that is often used for the soles of shoes, tires and other places where durability is crucial. SBS is a copolymer in which the backbone chain is made up of a short chain of polystyrene, then a long chain of polybutadiene, and then a short chain of polystyrene. See Thermoplastic Elastomers at www.psrc.usm.edu/macrog/tpe.htm. As a result of this structural arrangement, the polystyrene blocks of the SBS copolymer tend to associate with other polystyrene blocks, resulting in the formation of polystyrene clusters. See id. In effect, the polystyrene clusters act like crosslinks for the polybutadiene blocks. Because the polystyrene clusters can be broken up at high temperature, SBS can be processed and recycled like a non-crosslinked polymer. SBS is available from Eliokem under the tradename PLIOLITE®. See http://www.eliokem.com/prod_coatings_ple.php.

Another component of the blend in the inner cover layer of the present invention is trans-polyisoprene, which is a synthetic balata material. Trans-polyisoprene, also known as gutta-percha, is a harder material than natural rubber, which is about 30% of cis-polyisoprene. See Steve Rotter, Erasers, 80 Chem. & Eng. News 33 (2002), also available at http://pubs.acs.org/cen/whatstuff/stuff/8050erasers.html. Trans-polyisoprene is available from Kurrary Co. as TP-301.

Styrene-block copolymer and trans-polyisoprene are blended in the ratios of about 1% styrene-block copolymer to about 99% trans-polyisoprene, to about 50% styrene-block copolymer to about 50% trans-polyisoprene. In a preferred embodiment, the inner cover is a blend of about 25% styrene-block copolymer to about 75% trans-polyisoprene.

The blend of styrene-block copolymer and trans-polyisoprene has a two week flexural modulus of greater than about 50,000 psi. Preferably, the flexural modulus of the blend may be greater than about 60,000 psi.

The blend of SBS and trans-isoprene may further include a density adjusting material, such as a filler, such that the blend has a specific gravity of greater than about 1.0. Preferably, the specific gravity of the blend is greater than about 3.0.

Suitable fillers have small particle size and high specific gravity, such as barites or tungsten. To increase the moment of inertia, the weight of the inner cover should be relatively high. Furthermore, the inner cover layer may also include flakes or other fillers designed to create a tortuous path for water vapor, so that the inner cover layer can be a barrier against water vapor encroachment. Water vapor barrier layer is fully disclosed in commonly owned U.S. Pat. No. 6,632,147, which is incorporated herein by reference. Also, the inner cover layer may be vulcanized as it is applied to a wound core, or in a post molding step. The outer surface of the inner cover layer may be treated prior to application of the outer cover, by one or more of halogenation, chemical surface modification or treatment, UV radiation, electron beam exposure, microwave radiation, coating (via spray, dip, or electrostatic application), plasma, or corona discharge, as described in commonly owned U.S. Pat. No. 6,315,915, which is incorporated herein by express reference thereto. Preferably, the treatment will increase adhesion of the inner cover layer to the outer cover. The treatment may be used to activate a material compounded into the base material which will have the same preferred interaction with the outer cover to facilitate, for example, adhesion. The treatment may further be used to activate a material such that the softening point of the base material is increased, improving the temperature stability of the final product. The core preferably provides stiffness to the inner cover layer.

For a ball having a diameter of 1.68 inches, the outer diameter of the inner cover layer is preferably from about 1.55 inches to about 1.67 inches. In one embodiment, the outer diameter is from about 1.6 inches to about 1.64 inches. An exemplary inner cover layer outer diameter is 1.62 inches. In another embodiment, the outer diameter is between about 1.66 and about 1.67 inches. The inner cover layer preferably has a thickness of about 0.01 inches to about 0.1 inches, more preferably about 0.15 inch.

In one preferred embodiment, the inner cover layer has a hardness of about 20 to about 80 Shore D, preferably about 50 to about 75 Shore D, and more preferably about 60 to about 75 Shore D.

The compression of the core and the inner cover layer is typically from about 20 to about 100, preferably from about 40 to about 90. In one preferred embodiment, the core and the inner cover layer compression is from about 50 to about 80. In one embodiment, the inner cover layer has a specific gravity of about 0.8 to about 1.3, preferably about 0.9 to about 1.2. In one embodiment, the weight of the partly formed golf ball including inner cover layer is about 40 g to about 46 g, preferably about 40 to about 42 g. The loss tangent of the inner cover layer can, in one embodiment, be from about 0.03 to 0.08 from a temperature of about −30° C. to about 20° C. The elasticity and complex modulus of the inner cover layer can be from about 5,000 to about 12,000 Kgf/cm$^2$ over a temperature of about −30° C. to about 20° C. The following table lists preferred inner cover layer materials and their properties.

| Blend | Shore D | JIS C | Tensile (kpsi) | Flex (kpsi) | Melt Flow |
|---|---|---|---|---|---|
| 100[1] | 47 | 78 | 26 | 44 | 0.41 |
| 90/10 | 50 | 80 | 33 | 50 | 0.41 |
| 75/25 | 53 | 85 | 41 | 74 | 0.53 |
| 60/40 | 56 | 87 | 63 | 108 | |
| 50/50 | 59 | 91 | 136 | 139[3] | 0.56 |
| 1.0 SG[2] w/Barytes | 50 | 82 | | 57 | |
| 1.1 SG w/Barytes | 52 | 83 | | 62 | |
| 1.2 SG w/Barytes | 51 | 83 | 40 | 63 | |
| 1.3 SG w/Barytes | 52 | 85 | 43 | 69 | |
| 1.0 SG w/Tungsten | 50 | 82 | 37 | 56 | |
| 1.1 SG w/Tungsten | 49 | 82 | 36 | 55 | |
| 1.2 SG w/Tungsten | 50 | 83 | 39 | 56 | |
| 1.3 SG w/Tungsten | 50 | 83 | 40 | 60 | |

[1]The Blend Ratios are made with Balata/Pliolite ® SBS.
[2]The blends with the SG change are made with the 90 Balata/10 Pliolite ® SBS blend.
[3]The 50/50 flex bars all failed during testing.

Outer cover layer 20 of this invention preferably comprises of a polyurethane, a polyurea or a mixture thereof, with a hardness of less than about Shore D 65. To reach the desirable hardness, the polyurethane and polyurea can be blended with fillers. Suitable fillers are also disclosed below.

Suitable cover materials include, but are not limited to:

(1) Polyurethanes, such as those prepared from polyols and diisocyanates or polyisocyanates and those disclosed in U.S. Pat. Nos. 5,334,673 and 6,506,851 and U.S. patent application Ser. No. 10/194,059;

(2) Polyureas, such as those disclosed in U.S. Pat. No. 5,484,870 and U.S. patent application Ser. No. 10/228,311; and (3) Polyurethane-urea hybrids, blends or copolymers comprising urethane or urea segments.

The outer cover layer preferably includes a polyurethane composition comprising the reaction product of at least one polyisocyanate and at least one curing agent. The curing agent can include, for example, one or more diamines, one or more polyols, or a combination thereof. The polyisocyanate can be combined with one or more polyols to form a prepolymer, which is then combined with the at least one curing agent. Thus, the polyols described herein are suitable for use in one or both components of the polyurethane material, i.e., as part of a prepolymer and in the curing agent.

In yet another embodiment, the polyurethane composition includes at least one isocyanate, at least one polyol, and at least one curing agent. Exemplary polyisocyanates include, but are not limited to, 4,4'-diphenylmethane diisocyanate ("MDI"), polymeric MDI, carbodimide-modified liquid MDI, 4,4'-dicyclohexylmethane diisocyanate ("H$_{12}$MDI"), p-phenylene diisocyanate ("PPDI"), toluene diisocyanate ("TDI"), 3,3'-dimethyl-4,4'-biphenylene diisocyanate ("TODI"), isophoronediisocyanate ("IPDI"), hexamethylene diisocyanate ("HDI"), naphthalene diisocyanate ("NDI"); xylene diisocyanate ("XDI"); para-tetramethylxylene diisocyanate ("p-TMXDI"); meta-tetramethylxylene diisocyanate ("m-TMXDI"); ethylene diisocyanate; propylene-1,2-diisocyanate; tetramethylene-1,4-diisocyanate; cyclohexyl diisocyanate; 1,6-hexamethylene-diisocyanate ("HDI"); dodecane-1,12-diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; methyl cyclohexylene diisocyanate; triisocyanate of HDI; triisocyanate of 2,4,4-trimethyl-1,6-hexane diisocyanate ("TMDI"), tetracene diisocyanate, naphthalene diisocyanate, anthracene diisocyanate, and mixtures thereof. Polyisocyanates are known to those of ordinary skill in the art as having more than one isocyanate group, e.g., di-, tri, and tetra-isocyanate. Preferably, the polyisocyanate includes MDI, PPDI, TDI, or a mixture thereof, and more preferably, the polyisocyanate includes MDI. It should be understood that, as used herein, the term "MDI" includes 4,4'-diphenylmethane diisocyanate, polymeric MDI, carbodiimide-modified liquid MDI, and mixtures thereof and, additionally, that the diisocyanate employed may be "low free monomer," understood by one of ordinary skill in the art to have lower levels of "free" monomer isocyanate groups than conventional diisocyanates, i.e., the compositions of the invention typically have less than about 0.1% free monomer groups. Examples of "low free monomer" diisocyanates include, but are not limited to Low Free Monomer MDI, Low Free Monomer TDI, and Low Free Monomer PPDI.

Suitable polyisocyanates should have less than about 14% unreacted NCO groups. Preferably, polyisocyanates should have no greater than about 7.5% NCO, more preferably, from about 2.5% to about 7.5%, and most preferably, from about 4% to about 6.5%.

The polyol component of the polyurethane can be polyester polyols. Suitable polyester polyols include, but are not limited to, polyethylene adipate glycol, polybutylene adipate glycol, polyethylene propylene adipate glycol, ortho-phthalate-1,6-hexanediol, and mixtures thereof. The hydrocarbon chain can have saturated or unsaturated bonds, or substituted or unsubstituted aromatic and cyclic groups.

Alternatively, the polyol component can be polycaprolactone polyols. Suitable polycaprolactone polyols include, but are not limited to, 1,6-hexanediol-initiated polycaprolactone, diethylene glycol initiated polycaprolactone, trimethylol propane initiated polycaprolactone, neopentyl glycol initiated polycaprolactone, 1,4-butanediol-initiated polycaprolactone, and mixtures thereof. The hydrocarbon chain can have saturated or unsaturated bonds, or substituted or unsubstituted aromatic and cyclic groups.

Alternatively, the polyol component can be polycarbonate polyols. Suitable polycarbonates include, but are not limited to, polyphthalate carbonate. The hydrocarbon chain can have saturated or unsaturated bonds, or substituted or unsubstituted aromatic and cyclic groups.

The curing agent may include a polyol curing agent. Suitable polyol curing agents include, but are not limited to, ethylene glycol, diethylene glycol, polyethylene glycol, polyethylene propylene glycol, polypropylene glycol, lower molecular weight polytetramethylene ether glycol, 1,3-bis (2-hydroxyethoxy) benzene, 1,3-bis-[2-(2-hydroxyethoxy) ethoxy]benzene, 1,3-bis-{2-[2-(2-hydroxyethoxy)ethoxy] ethoxy}benzene, 1,4-butanediol, 1,5-pentanediol, 1,6- hexanediol, resorcinol-di-(β-hydroxyethyl) ether, hydroquinone-di-(β-hydroxyethyl) ether, trimethylol propane, or mixtures thereof.

Polyamine curatives are also suitable for use in the curing agent of the polyurethane composition and have been found to improve cut, shear, and impact resistance of the resultant balls. Preferred polyamine curatives include, but are not limited to, 3,5-dimethylthio-2,4-toluenediamine and isomers thereof; 3,5-diethyltoluene-2,4-diamine and isomers thereof, such as 3,5-diethyltoluene-2,6-diamine; 4,4'-bis-(sec-butylamino)-diphenylmethane; 1,4-bis-(sec-butylamino)-benzene; 4,4'-methylene-bis-(2-chloroaniline); 4,4'-methylene-bis-(3-chloro-2,6-diethylaniline); polytetramethyleneoxide-di-p-aminobenzoate; N,N'-dialkyldiamino diphenyl methane; p,p'-methylene dianiline ("MDA"); m-phenylene-diamine ("MPDA"); 4,4'-methylene-bis-(2-chloroaniline) ("MOCA"); 4,4'-methylene-bis-(2,6-diethylaniline); 4,4'-di-amino-3,3'-diethyl-5,5'-dimethyl diphenylmethane; 2,2',3,3'-tetrachloro diamino diphenylmethane; 4,4'-methylene-bis-(3-chloro-2,6-diethylaniline); trimethylene glycol di-p-aminobenzoate; and mixtures thereof. Preferably, the curing agent of the present invention includes 3,5-dimethylthio-2,4-toluenediamine and isomers thereof, such as ETHACURE 300. Suitable polyamine curatives, which include both primary and secondary amines, preferably have weight average molecular weights ranging from about 64 to about 2000.

Additionally, at least one of a diol, triol, tetraol, or hydroxy-terminated curative may be added to the aforementioned polyurethane composition. Suitable diol, triol, and tetraol groups include ethylene glycol; diethylene glycol; polyethylene glycol; propylene glycol; polypropylene glycol; lower molecular weight polytetramethylene ether glycol; 1,3-bis(2-hydroxyethoxy) benzene; 1,3-bis-[2-(2-hydroxyethoxy)ethoxy]benzene; 1,3-bis-{2-[2-(2-hydroxyethoxy)ethoxy]ethoxy}benzene; 1,4-butanediol; 1,5-pentanediol; 1,6-hexanediol; resorcinol-di-(4-hydroxyethyl) ether; hydroquinone-di-(4-hydroxyethyl) ether; and mixtures thereof. Preferred hydroxy-terminated curatives include ethylene glycol; diethylene glycol; 1,4-butanediol; 1,5-pentanediol; 1,6-hexanediol, trimethylol propane, and mixtures thereof.

Preferably, the hydroxy-terminated curatives have molecular weights ranging from about 48 to 2000. Both the hydroxy-terminated and amine curatives can include one or more saturated, unsaturated, aromatic, and cyclic groups. Additionally, the hydroxy-terminated and amine curatives can include one or more halogen groups. The polyurethane composition can be formed with a blend or mixture of curing agents or with a single curing agent.

An optional filler component may be chosen to impart additional density to blends of the previously described components. The selection of the filler component is dependent upon the characteristics of the golf ball desired. Examples of fillers for use in the filler component of the polyurethane include those described herein. Similar or identical additives, such as nanoparticles, fibers, glass spheres, and/or various metals, such as titanium and tungsten, can be added to the polyurethane compositions of the present invention, as well, in amounts as needed to modify one or more golf ball properties. Additional components that can be added to the polyurethane composition include UV stabilizers and other dyes, as well as optical brighteners and fluorescent pigments and dyes. Such additional ingredients may be added in any amounts that will achieve their desired purpose.

Any known method may be used to combine the polyisocyanate, polyol, and curing agent of the present invention. One suitable method, known in the art as a one-shot method, involves concurrent mixing of the polyisocyanate, polyol, and curing agent. A preferred method of mixing is known as a prepolymer method. In this method, the polyisocyanate and the polyol are mixed separately prior to addition of the curing agent. This method affords a more homogeneous mixture resulting in a more consistent polymer composition.

Due to the very thin nature, the use of a castable, reactive material applied in a fluid form makes it possible to obtain very thin outer cover layers on golf balls. Specifically, castable, reactive liquids, which react to form a urethane elastomer material, provide desirable very thin outer cover layers.

The castable, reactive liquid employed to form the urethane elastomer material can be applied over the core or inner cover using a variety of application techniques such as spraying, dipping, spin coating, or flow coating methods which are well known in the art. An example of a suitable coating technique is that which is disclosed in U.S. Pat. No. 5,733,428, entitled "Method For Forming Polyurethane Cover On Golf Ball Core," the disclosure of which is hereby incorporated herein in its entirety by express reference thereto.

Similarly, U.S. Pat. No. 5,006,297 to Brown et al. and U.S. Pat. No. 5,334,673 to Wu both also disclose suitable molding techniques which may be utilized to apply the castable reactive liquids employed in the present invention. The disclosures of each patent is hereby expressly incorporated herein by express reference thereto. The method of the invention, however, is not limited to the use of these techniques.

In one embodiment, the cover typically has a loss tangent of about 0.16 to about 0.075 from −30° C. to 20° C. In one embodiment, the complex modulus of the cover layer on the ball is from about 1000 to about 2800 Kgf/cm$^2$ from −30° C. to 20° C. In one embodiment, the specific gravity of the cover material is from about 1 to about 2, preferably from about 1.1 to about 1.4. In one preferred embodiment, the cover material has a specific gravity of about 1.10 to about 1.25.

The outer cover layer should have a material hardness, as measured by ASTM D2240-00, from about 20 to about 60 Shore D, preferably from about 30 to about 50 Shore D, more preferably about 45 Shore D. When the hardness of the outer cover material is measured directly on the golf ball, the values tend to be higher than then the material hardness. The outer cover hardness, as measured on the golf ball, is preferably from about 45 to about 60 Shore D. The inner cover layer, preferably has a material hardness of about 50 to about 70 Shore D, more preferably from about 60 to about 65 Shore D.

As stated above, the core can be made from either (a) thermosetting material such as polybutadiene, ZDA, peroxide and a cis-to-trans catalyst, or (b) thermoplastic material such as highly neutralized polymer that is fully neutralized, whereby the core has a diameter at least about 1.55 inches, a compression of less than about 85, and a COR greater than about 0.815.

If the core is made from thermosetting material, the core composition preferably includes at least one rubber material having a resilience index of at least about 40. Preferably, the resilience index is at least about 50. A comparison of a number of polybutadiene polymers are listed in Table 1 below. Polymers that produce resilient golf balls and, therefore, are suitable for use in the center or other portions of a golf ball according to the present invention include, but are not limited to, CB23, CB22, BR60, and 1207G.

TABLE 1

Resilience Index of example polybutadiene polymers

| Rubber | Tan δ at 10 cpm | Tan δ at 1000 cpm | Resilience Index at 100° C. |
|---|---|---|---|
| CB23 | 0.954 | 0.407 | 55 |
| CB22 | 0.895 | 0.358 | 54 |
| BR-60 | 0.749 | 0.350 | 40 |
| BR-40 | 0.841 | 0.446 | 40 |
| Taktene 8855 | 0.720 | 0.414 | 31 |
| CARIFLEX BR1220 | 0.487 | 0.439 | 5 |
| BUDENE 1207G | 0.825 | 0.388 | 44 |

The thermosetting material in the core comprises a reaction product that includes a cis-to-trans catalyst, a resilient polymer component having polybutadiene, a free radical source, and optionally, a crosslinking agent, a filler, or both. Preferably, the polybutadiene reaction product is used to form at least a portion of the core of the golf ball, and further discussion below relates to this embodiment for preparing the core. Preferably, the reaction product has a first dynamic stiffness measured at −50° C. that is less than about 130 percent of a second dynamic stiffness measured at 0° C. More preferably, the first dynamic stiffness is less than about 125 percent of the second dynamic stiffness. Most preferably, the first dynamic stiffness is less than about 110 percent of the second dynamic stiffness.

The cis-to-trans conversion requires the presence of a cis-to-trans catalyst, such as an organosulfur or metal-containing organosulfur compound, a substituted or unsubstituted aromatic organic compound that does not contain sulfur or metal, an inorganic sulfide compound, an aromatic organometallic compound, or mixtures thereof. The cis-to-trans catalyst component may include one or more of the cis-to-trans catalysts described herein. For example, the cis-to-trans catalyst may be a blend of an organosulfur component and an inorganic sulfide component.

The preferred organosulfur components include 4,4'-diphenyl disulfide, 4,4'-ditolyl disulfide, or 2,2'-benzamido diphenyl disulfide, or a mixture thereof. A more preferred organosulfur component includes 4,4'-ditolyl disulfide. The organosulfur cis-to-trans catalyst, when present, is preferably present in an amount sufficient to produce the reaction product so as to contain at least about 12 percent trans-polybutadiene isomer, but typically is greater than about 32 percent trans-polybutadiene isomer based on the total resilient polymer component. In another embodiment, metal-containing organosulfur components can be used according to the invention. Suitable metal-containing organosulfur components include, but are not limited to, cadmium, copper, lead, and tellurium analogs of diethyldithiocarbamate, diamyldithiocarbamate, and dimethyldithiocarbamate, or mixtures thereof. Additional suitable examples of can be found in commonly owned and copending U.S. patent application Ser. No. 10/402,592.

The cis-to-trans catalyst or organosulfur compound, preferably halogenated, is a compound having cis-to-trans catalytic activity or a sulfur atom (or both), and is present in the polymeric composition by at least about 0.01 phr, preferably at least about 0.05 phr, more preferably at least about 0.1 phr, even more preferably greater than about 0.25 phr, optionally greater than about 2 phr, such as greater than about 2.2 phr, or even greater than about 2.5 phr, but no more than about 10 phr, preferably less than about 5 phr, more preferably less than about 2 phr, even more preferably less than about 1.1 phr, such as less than about 0.75 phr, or even less than about 0.6 phr. Useful compounds of this category include those disclosed in U.S. Pat. Nos. 6,525,141, 6,465,578, 6,184,301, 6,139,447, 5,697,856, 5,816,944, and 5,252,652, the disclosures of which are incorporated by reference in their entirety.

One group of suitable organosulfur compounds are halogenated thiophenols and metallic compounds thereof, which are exemplified by pentafluorothiophenol, 2-fluorothiophenol, 3-fluorothiophenol, 4-fluorothiophenol, 2,3-fluorothiophenol, 2,4-fluorothiophenol, 3,4-fluorothiophenol, 3,5-fluorothiophenol 2,3,4-fluorothiophenol, 3,4,5-fluorothiophenol, 2,3,4,5-tetrafluorothiophenol, 2,3,5,6-tetrafluorothiophenol, 4-chlorotetrafluorothiophenol, pentachlorothiophenol, 2-chlorothiophenol, 3-chlorothiophenol, 4-chlorothiophenol, 2,3-chlorothiophenol, 2,4-chlorothiophenol, 3,4-chlorothiophenol, 3,5-chlorothiophenol, 2,3,4-chlorothiophenol, 3,4,5-chlorothiophenol, 2,3,4,5-tetrachlorothiophenol, 2,3,5,6-tetrachlorothiophenol, pentabromothiophenol, 2-bromothiophenol, 3-bromothiophenol, 4-bromothiophenol, 2,3-bromothiophenol, 2,4-bromothiophenol, 3,4-bromothiophenol, 3,5-bromothiophenol, 2,3,4-bromothiophenol, 3,4,5-bromothiophenol, 2,3,4,5-tetrabromothiophenol, 2,3,5,6-tetrabromothiophenol, pentaiodothiophenol, 2-iodothiophenol, 3-iodothiophenol, 4-iodothiophenol, 2,3-iodothiophenol, 2,4-iodothiophenol, 3,4-iodothiophenol, 3,5-iodothiophenol, 2,3,4-iodothiophenol, 3,4,5-iodothiophenol, 2,3,4,5-tetraiodothiophenol, 2,3,5,6-tetraiodothiophenol and, the metal salts thereof, and mixtures thereof. The metal ions, when present, are associated with the thiophenols, and are chosen from zinc, calcium, magnesium, cobalt, nickel, iron, copper, sodium, potassium, and lithium, among others. Halogenated thiophenols associated with organic cations such as ammonium are also useful for the present invention.

More specifically, workable halogenated thiophenols include pentachlorothiophenol, zinc pentachlorothiophenol, magnesium pentachlorothiophenol, cobalt pentachlorothiophenol, pentafluorothiophenol, zinc pentafluorothiophenol, and blends thereof. Preferred candidates are pentachlorothiophenol (available from Strucktol Company of Stow, Ohio), zinc pentachlorothiophenol (available from eChinachem of San Francisco, Calif.), and blends thereof.

Another group of suitable organosulfur compounds are organic disulfides which include, without limitation, perhalogenated (i.e., fully halogenated) organic disulfides and organometallic disulfides. Perhalogenated compounds are preferably perfluorinated, perchlorinated, and/or perbrominated. Perhalogenated organic disulfides include perhalogenated derivatives of any and all organic disulfides known and/or available to one skilled in the art, which include those disclosed herein, such as ditolyl disulfides, diphenyl disulfides, quinolyl disulfides, benzoyl disulfides, and bis(4-acryloxybenzene)disulfide, among others. A particular example is perchloroditolyl disulfide. Organometallic disulfides include combinations of any metal cations disclosed herein with any organic disulfides disclosed herein. A particular example is zinc ditolyl disulfide.

Suitable substituted or unsubstituted aromatic organic components that do not include sulfur or a metal include, but are not limited to, 4,4'-diphenyl acetylene, azobenzene, or a mixture thereof. The aromatic organic group preferably ranges in size from $C_6$ to $C_{20}$, and more preferably from $C_6$ to $C_{10}$. Suitable inorganic sulfide components include, but are not limited to titanium sulfide, manganese sulfide, and sulfide analogs of iron, calcium, cobalt, molybdenum, tungsten, copper, selenium, yttrium, zinc, tin, and bismuth.

The cis-to-trans catalyst can also include a Group VIA component. Elemental sulfur and polymeric sulfur are commercially available from, e.g., Elastochem, Inc. of Chardon, Ohio. Exemplary sulfur catalyst compounds include PB(RM-S)-80 elemental sulfur and PB(CRST)-65 polymeric sulfur, each of which is available from Elastochem, Inc. An exemplary tellurium catalyst under the tradename TELLOY and an exemplary selenium catalyst under the tradename VANDEX are each commercially available from RT Vanderbilt.

A free-radical source, often alternatively referred to as a free-radical initiator, is required in the composition and method. The free-radical source is typically a peroxide, and preferably an organic peroxide. Suitable free-radical sources include di-t-amyl peroxide, di(2-t-butyl-peroxyisopropyl) benzene peroxide, 3,3,5-trimethyl cyclohexane, a-a bis(t-butylperoxy) diisopropylbenzene, 1,1-bis(t-butylperoxy)-3,3,5-trimethylcyclohexane, dicumyl peroxide, di-t-butyl peroxide, 2,5-di-(t-butylperoxy)-2,5-dimethyl hexane, n-butyl-4,4-bis(t-butylperoxy)valerate, lauryl peroxide, benzoyl peroxide, t-butyl hydroperoxide, and the like, and any mixture thereof.

A crosslinking agent is included to increase the hardness of the reaction product. Suitable crosslinking agents include one or more metallic salts of unsaturated fatty acids or monocarboxylic acids, such as zinc, aluminum, sodium, lithium, nickel, calcium, or magnesium acrylate salts, and the like, and mixtures thereof. Preferred acrylates include zinc acrylate, zinc diacrylate (ZDA), zinc methacrylate, and zinc dimethacrylate (ZDMA), and mixtures thereof. The crosslinking agent must be present in an amount sufficient to crosslink a portion of the chains of polymers in the resilient polymer component. For example, the desired compression may be obtained by adjusting the amount of crosslinking. This may be achieved, for example, by altering the type and amount of crosslinking agent, a method well-known to those of ordinary skill in the art.

The compositions of the present invention may also include fillers, added to the polybutadiene material to adjust the density and/or specific gravity of the core or to the cover. Fillers are typically polymeric or mineral particles. Exemplary fillers include precipitated hydrated silica, clay, talc, asbestos, glass fibers, aramid fibers, mica, calcium metasilicate, barium sulfate, zinc sulfide, lithopone, silicates, silicon carbide, diatomaceous earth, polyvinyl chloride, carbonates such as calcium carbonate and magnesium carbonate, metals such as titanium, tungsten, aluminum, bismuth, nickel, molybdenum, iron, lead, copper, boron, cobalt, beryllium, zinc, and tin, metal alloys such as steel, brass, bronze, boron carbide whiskers, and tungsten carbide whiskers, metal oxides such as zinc oxide, iron oxide, aluminum oxide, titanium oxide, magnesium oxide, and zirconium oxide, particulate carbonaceous materials such as graphite, carbon black, cotton flock, natural bitumen, cellulose flock, and leather fiber, micro balloons such as glass and ceramic, fly ash, and combinations thereof.

Antioxidants may also optionally be included in the polybutadiene material in the centers produced according to the present invention. Antioxidants are compounds that can inhibit or prevent the oxidative degradation of the polybutadiene. Antioxidants useful in the present invention include, but are not limited to, dihydroquinoline antioxidants, amine type antioxidants, and phenolic type antioxidants.

Other optional ingredients, such as accelerators, e.g., tetramethylthiuram, peptizers, processing aids, processing oils, plasticizers, dyes and pigments, as well as other additives well known to those of ordinary skill in the art may also be used in the present invention in amounts sufficient to achieve the purpose for which they are typically used.

The compression of the core, or portion of the core, of golf balls prepared according to the invention is typically from about 15 to 100. In one embodiment, the compression is below about 50, more preferably below about 25. In a preferred embodiment, the compression is from about 60 to 90, more preferably from about 70 to 85. Various equivalent methods of measuring compression exist. For example, a 70 Atti compression (also previously referred to as the "PGA Compression") is equivalent to a center hardness of 3.2 mm deflection under a 100 kg load and a "spring constant" of 36 Kgf/mm. In one embodiment, the golf ball core has a deflection of about 3.3 mm to 7 mm under a 130 kg-10 kg test.

Alternatively, the core of the present invention is thermoplastic, comprising essentially a highly neutralized polymer ("HNP") that is formed from a reaction between an acid group on the polymer and a suitable source of cation that comprises an organic acid or the corresponding salt. The organic acid or salt thereof being present is in an amount sufficient to neutralize the polymer by at least about 80%. In a preferred embodiment, the polymer may be neutralized by about 90%. In another preferred embodiment, the polymer may be neutralized by about 100%.

The HNP's comprises ionomeric copolymers, ionomeric terpolymers, ionomer precursors, thermoplastics, thermoplastic elastomers, grafted metallocene-catalyzed polymers, non-grafted metallocene-catalyzed polymers, single-site polymers, highly crystalline acid polymers and ionomers thereof, cationic ionomers and mixtures thereof.

Examples of organic acid of the HNP include, but are not limited to, an aliphatic organic acid, an aromatic organic acid, a saturated mono-functional organic acid, a saturated di-functional organic acid, a saturated multi-functional organic acid, an unsaturated mono-functional organic acid, an unsaturated di-functional organic acid, an unsaturated multi-functional organic acid, and a multi-unsaturated mono-functional organic acid.

Suitable cations can be used to neutralize the organic acids of the HNP. Examples of suitable cations include, but are not limited to, barium, lithium, sodium, zinc, bismuth, chromium, cobalt, copper, potassium, strontium, titanium, tungsten, magnesium, cesium, iron, nickel, silver, aluminum, tin, or calcium.

Alternatively, salts of fatty acids can be used to neutralize the organic acids of the HNP. These fatty acids include, but are not limited to, caprioic acid, caprylic acid, capric acid, lauric acid, stearic acid, behenic acid, erucic acid, oleic acid, linoelic acid, or dimerized derivatives thereof.

Exemplary HPN thermoplastic ionomer resins are obtained by providing a cross metallic bond to polymers of monoolefin with at least one member selected from the group consisting of unsaturated mono- or di-carboxylic acids having 3 to 12 carbon atoms and esters thereof. The polymer contains 1 to 50% by weight of the unsaturated mono- or di-carboxylic acid and/or ester thereof. More particularly, low modulus ionomers, such as acid-containing ethylene copolymer ionomers, include E/X/Y copolymers where E is ethylene, X is acrylic or methacrylic acid present in 5-35 (preferably 10-35, most preferably 15-35, making the ionomer a high acid ionomer) weight percent of the polymer, and Y is a softening co-monomer such as acrylate or methacrylate present in 0-50 (preferably 0-25, most preferably 0-2), weight percent of the polymer, wherein the acid moiety is neutralized 1-100% (preferably at least 80%, most preferably about 100%) to form an ionomer by a cation such as lithium, sodium, potassium, magnesium, calcium, barium, lead, tin, zinc or aluminum, or a combination of such cations. In another embodiment, lithium, sodium, potassium, magnesium, calcium and zinc are the preferred cations in these HNP.

Examples of HNP that are suitable for this invention are specific acid-containing ethylene copolymers, including ethylene/acrylic acid, ethylene/methacrylic acid, ethylene/acrylic acid/n-butyl acrylate, ethylene/methacrylic acid/n-butyl acrylate, ethylene/methacrylic acid/methyl acrylate, ethylene/methacrylic acid/methyl acrylate, ethylene/methacrylic acid/methyl methacrylate, and ethylene/acrylic acid/n-butyl methacrylate. Preferred acid-containing ethylene copolymers include ethylene/methacrylic acid, ethylene/acrylic acid, ethylene/methacrylic acid/n-butyl acrylate, ethylene/acrylic acid/n-butyl acrylate, ethylene/methacrylic acid/methyl acrylate and ethylene/acrylic acid/methyl acrylate copolymers. The most preferred acid-containing ethylene copolymers are ethylene/methacrylic acid, ethylene/acrylic acid, ethylene/(meth)acrylic acid/n-butyl acrylate, ethylene/(meth)acrylic acid/ethyl acrylate, and ethylene/(meth)acrylic acid/methyl acrylate copolymers.

Additional HNP ionomers suitable for use in this invention are described in WO 00/23519, WO 01/29129, and in commonly-owned and copending U.S. patent application Ser. Nos. 10/877,344 and 10/882,130. All the references herein mentioned are incorporated by reference in their entireties.

Optionally, filler component is chosen to impart additional density to blends of the previously described components, the selection being dependent upon the different parts (e.g., cover, mantle, core, center, intermediate layers in a multilayered core or ball) and the type of golf ball desired (e.g., one-piece, two-piece, three-piece or multiple-piece ball), as will be more fully detailed below. Generally, the filler will be inorganic having a density greater than about 4 grams/cubic centimeter (gm/cc), preferably greater than 5 gm/cc, and will be present in amounts between 0 to about 60 wt. % based on the total weight of the composition. Examples of useful fillers include those described herein. It is preferred that the filler materials be non-reactive or almost non-reactive and not stiffen or raise the compression nor reduce the coefficient of restitution significantly.

Additionally, other additives useful in the practice of the subject invention include acid copolymer wax (e.g., Allied wax AC 143 believed to be an ethylene/16-18% acrylic acid copolymer with a number average molecular weight of 2,040), which assist in preventing reaction between the filler materials (e.g., ZnO) and the acid moiety in the ethylene copolymer. Other optional additives include $TiO_2$, which is used as a whitening agent, optical brighteners, surfactants, processing aids, etc.

HNP ionomers may be blended with conventional ionomeric copolymers (di-, ter-, etc.), using well-known techniques, to manipulate product properties as desired. The blends would still exhibit lower hardness and higher resilience when compared with blends based on conventional ionomers.

EXAMPLES

The resultant golf balls typically have a coefficient of restitution of greater than about 0.7, preferably greater than about 0.75, and more preferably greater than about 0.78. The golf balls also typically have an Atti compression (which has been referred to as PGA compression in the past) of at least about 40, preferably from about 50 to 120, and more preferably from about 60 to 100.

Other than in the operating examples, or unless otherwise expressly specified, all of the numerical ranges, amounts, values and percentages such as those for amounts of materials, and others in the specification may be read as if prefaced by the word "about" even though the term "about" may not expressly appear with the value, amount or range. Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

While it is apparent that the illustrative embodiments of the invention disclosed herein fulfill the preferred embodiments of the present invention, it is appreciated that numerous modifications and other embodiments may be devised by those skilled in the art. Examples of such modifications include slight variations of the numerical values discussed above. Hence, the numerical values stated above and claimed below specifically include those values and the values that are approximately or nearly close to the stated and claimed values. Therefore, it will be understood that the appended claims are intended to cover all such modifications and embodiments, which would come within the spirit and scope of the present invention.

What is claimed is:

1. A multi-layer golf ball comprising at least an inner cover layer, an outer cover layer and a core, wherein
   the inner cover layer is a non-ionomeric material comprising a blend of a styrene-block copolymer, and a trans-polyisoprene, and
   the golf ball has a coefficient of restitution of at least 0.805.

2. The multi-layer golf ball of claim 1, wherein the coefficient of restitution of the core is greater than 0.815.

3. The multi-layer golf ball of claim 1, wherein said blend ranges from a ratio of 1 part of styrene-block copolymer to 99 parts of trans-polyisoprene, to a ratio of 50 parts of styrene-block copolymer to 50 parts of trans-polyisoprene.

4. The multi-layer golf ball of claim 3, wherein the blend in the inner cover layer is in a ratio of 25 parts of styrene-block copolymer to 75 parts of trans-polyisoprene.

5. The multi-layer golf ball of claim 1, wherein the styrene-block copolymer is a member selected from the group consisting of styrene-butadiene-styrene, styrene-ethylene-butadiene-styrene, styrene-isobutylene-styrene, styrene-isoprene-styrene, styrene-methacrylate-butadiene, styrene-acrylonitrile, styrene-acrylonitrile-butadiene, styrene-ethylene-propylene-acrylonitrile, styrene-maleic anhydride, and blends thereof.

6. The multi-layer golf ball of claim 1, wherein the styrene-block copolymer is styrene-butadiene-styrene.

7. The multi-layer golf ball of claim 1, wherein the inner cover layer has a specific gravity greater than 1.0.

8. The multi-layer golf ball of claim 7, wherein the blend in the inner cover layer has a specific gravity greater than 3.0.

9. The multi-layer golf ball of claim 1, wherein the inner cover layer has a flexural modulus greater than 50,000 psi.

10. The multi-layer golf ball of claim 9, wherein the blend in the inner cover layer has a flexural modulus greater than 60,000 psi.

11. The multi-layer golf ball of claim 1, wherein the inner cover layer has a hardness greater than Shore D 60.

12. The multi-layer golf ball of claim 1, wherein
the outer cover layer comprises a polyurethane, a polyurea, or a mixture thereof, and
the outer cover layer has a hardness of Shore D 65 or less.

13. The multi-layer golf ball of claim 12, wherein the polyurethane and the polyurea are prepared from a polyisocyanate, which is a member chosen from the group consisting of 4,4'-diphenylmethane diisocyanate; polymeric 4,4'-diphenylmethane diisocyanate; carbodiimide-modified liquid 4,4'-diphenylmethane diisocyanate; 4,4'-dicyclohexylmethane diisocyanate; p-phenylene diisocyanate; toluene diisocyanate; 3,3'-dimethyl-4,4'-biphenylene diisocyanate; isophoronediisocyanate; hexamethylene diisocyanate; naphthalene diisocyanate; xylene diisocyanate; p-tetramethylxylene diisocyanate; m-tetramethylxylene diisocyanate; ethylene diisocyanate; propylene-1,2-diisocyanate; tetramethylene-1,4-diisocyanate; cyclohexyl diisocyanate; 1,6-hexamethylene-diisocyanate; dodecane-1,12-diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; methyl cyclohexylene diisocyanate; triisocyanate of hexamethylene diisocyanate; triisocyanate of 2,4,4-trimethyl-1,6-hexane diisocyanate; tetracene diisocyanate; napthalene diisocyanate; anthracene diisocyanate; and mixtures thereof.

14. The golf ball of claim 12, wherein the polyurethane is prepared from a polyol, which is a member chosen from the group consisting of ethylene glycol; diethylene glycol; polyethylene glycol; propylene glycol; polypropylene glycol; lower molecular weight polytetramethylene ether glycol; 1,3-bis(2-hydroxyethoxy) benzene; 1,3-bis-[2-(2-hydroxyethoxy) ethoxy] benzene; 1,3-bis-{2-[2-(2-hydroxyethoxy) ethoxy] ethoxy} benzene; 1,4-butanediol; 1,5-pentanediol; 1,6-hexanediol; resorcinol-di-(β-hydroxyethyl) ether; hydroquinone-di-(β-hydroxyethyl) ether; and mixtures thereof.

15. The golf ball of claim 12, wherein the polyurea is prepared from a polyamine, which is a member chosen from the group consisting of 3,5-dimethylthio-2,4-toluenediamine; 3,5-diethyltoluene-2,4-diamine, 3,5-diethyltoluene-2,6-diamine; 4,4'-bis-(sec-butylamino)-diphenylmethane; 1,4-bis-(sec-butylamino)-benzene, 4,4'-methylene-bis-(2-chloroaniline); 4,4'-methylene-bis-(3-chloro-2,6-diethylaniline); polytetramethyleneoxide-di-p-aminobenzoate; N,N'-dialkyldiamino diphenyl methane; p,p'-methylene dianiline; m-phenylenediamine; 4,4'-methylene-bis-(2-chloroaniline); 4,4'-methylene-bis-(2,6-diethylaniline); 4,4'-diamino-3,3'-diethyl-5,5'-dimethyl diphenylmethane; 2,2',3,3'-tetrachloro diamino diphenylmethane; 4,4'-methylene-bis-(3-chloro-2,6-diethylaniline); trimethylene glycol di-p-aminobenzoate; and mixtures thereof.

16. The multi-layer golf ball of claim 1, wherein the core comprises thermosetting polymer.

17. The golf ball of claim 16, wherein the thermosetting material comprises a polybutadiene, a cis-to-trans catalyst, a free radical source, a crosslinking agent, and a filler.

18. The golf ball of claim 17, wherein the polybutadiene comprises cis-polybutadiene, trans-polybutadiene, vinyl-polybutadiene, or mixture thereof.

19. The golf ball of claim 17, wherein the cis-to-trans catalyst comprises a organosulfur compound, a metal-containing organosulfur compound, a substituted aromatic organic compound that does not contain sulfur or metal, an unsubstituted aromatic organic compound that does not contain sulfur or metal, an inorganic sulfide compound, an aromatic organometallic compound, a Group VIA element, or mixtures thereof.

20. The multi-layer golf ball of claim 17, wherein the crosslinking agent is a member selected from the group consisting zinc acrylate, zinc diacrylate, zinc methacrylate, zinc dimethacrylate, and mixtures thereof.

21. The multi-layer golf ball of claim 17, wherein the filler is a member selected from the group consisting of precipitated hydrated silica, clay, talc, asbestos, glass fibers, aramid fibers, mica, calcium metasilicate, barium sulfate, zinc sulfide, lithopone, silicates, silicon carbide, diatomaceous earth, polyvinyl chloride, calcium carbonate, magnesium carbonate, titanium, tungsten, aluminum, bismuth, nickel, molybdenum, iron, lead, copper, boron, cobalt, beryllium, zinc, tin, steel, brass, bronze, boron carbide whiskers, tungsten carbide whiskers, zinc oxide, iron oxide, aluminum oxide, titanium oxide, magnesium oxide, zirconium oxide, graphite, carbon black, cotton flock, natural bitumen, cellulose flock, leather fiber, glass, ceramic, fly ash, and combinations thereof.

22. The multi-layer golf ball of claim 1, wherein the core comprises a thermoplastic polymer.

23. The multi-layer golf ball of claim 22, wherein the thermoplastic material comprises a highly neutralized polymer formed from a reaction between a polymer containing acid groups, a suitable cation source, and an organic acid or salt thereof, wherein the suitable cation source is present in an amount sufficient to neutralize the acid groups by 80% or greater.

24. The multi-layer golf ball of claim 23, wherein the suitable cation source is present in an amount sufficient to neutralize the acid groups by 90% or greater.

25. The multi-layer golf ball of claim 23, wherein the suitable cation source is present in an amount sufficient to neutralize the acid groups by 100%.

26. The multi-layer golf ball of claim 23, wherein the highly neutralized polymer further comprises ionomeric copolymers, ionomeric terpolymers, ionomer precursors, thermoplastics, thermoplastic elastomers, grafted metallocene-catalyzed polymers, non-grafted metallocene-catalyzed polymers, single-site polymers, high-crystalline acid polymers and ionomers thereof, cationic ionomers, and mixtures thereof.

27. The multi-layer golf ball of claim 23, wherein the organic acid is selected from the group consisting of aliphatic organic acid, aromatic organic acid, saturated monofunctional organic acid, saturated di-functional organic acid, saturated multi-functional organic acid, unsaturated monofunctional organic acid, unsaturated di-functional organic acid, unsaturated multi-functional organic acid, and multi-unsaturated mono-functional organic acid.

28. The multi-layer golf ball of claim 23, wherein the salt of the organic acid comprises barium, lithium, sodium, zinc, bismuth, chromium, cobalt, copper, potassium, strontium, titanium, tungsten, magnesium, cesium, iron, nickel, silver, aluminum, tin, or calcium, salts of fatty acids comprising caprioic acid, caprylic acid, capric acid, lauric acid, stearic acid, behenic acid, erucic acid, oleic acid, linoelic acid, or dimerized derivatives thereof.

* * * * *